(12) United States Patent
Singh

(10) Patent No.: US 8,266,823 B2
(45) Date of Patent: Sep. 18, 2012

(54) METHOD AND APPARATUS FOR DEHYDRATING HIGH LEVEL WASTE BASED ON DEW POINT TEMPERATURE MEASUREMENTS

(75) Inventor: Krishna Singh, Palm Harbor, FL (US)

(73) Assignee: Holtec International, Inc.

( * ) Notice: Subject to any disclaimer, the term of this patent is extended or adjusted under 35 U.S.C. 154(b) by 210 days.

(21) Appl. No.: 12/641,378

(22) Filed: Dec. 18, 2009

(65) Prior Publication Data

US 2010/0212182 A1 Aug. 26, 2010

Related U.S. Application Data

(62) Division of application No. 11/145,785, filed on Jun. 6, 2005, now Pat. No. 7,707,741.

(51) Int. Cl.
*F26B 21/00* (2006.01)
*F26B 21/10* (2006.01)

(52) U.S. Cl. ............... 34/565; 34/572; 34/72; 34/80; 34/89; 34/218; 34/219

(58) Field of Classification Search .............. 34/572, 34/72, 73, 77, 78, 79, 80, 89, 218, 219, 443, 34/468, 471, 472, 475, 476, 477, 486, 493, 34/467, 516, 565
See application file for complete search history.

(56) References Cited

U.S. PATENT DOCUMENTS

| | | | |
|---|---|---|---|
| 3,010,889 A | 11/1961 | Fortescue et al. | |
| 3,448,859 A * | 6/1969 | Barker et al. | 210/770 |
| 3,666,616 A | 5/1972 | Schluderberg | |
| 3,865,688 A | 2/1975 | Kleimola | |
| 3,950,152 A | 4/1976 | Guon | |
| 4,709,579 A | 12/1987 | Parker et al. | |
| 4,755,347 A | 7/1988 | Tolmie | |
| 4,828,760 A | 5/1989 | Chung et al. | |
| 4,952,339 A * | 8/1990 | Temus et al. | 588/20 |
| 5,453,562 A | 9/1995 | Swanstrom et al. | |
| 5,646,971 A | 7/1997 | Howe | |
| 5,839,206 A * | 11/1998 | Lisson et al. | 34/132 |
| 5,898,747 A | 4/1999 | Singh | |
| 6,372,157 B1 | 4/2002 | Krill, Jr. et al. | |
| 6,684,526 B2 | 2/2004 | Tully | |
| 7,096,600 B2 | 8/2006 | Singh | |
| 7,210,247 B2 | 5/2007 | Singh | |
| 2008/0056935 A1 | 3/2008 | Singh | |

FOREIGN PATENT DOCUMENTS

| | | |
|---|---|---|
| DE | 3226986 | 1/1984 |
| DE | 19814791 | 11/1999 |
| EP | 1429344 | 6/2004 |
| GB | 2096520 | 10/1982 |
| JP | 61251798 | 11/1986 |
| JP | 2004219408 | 8/2004 |

* cited by examiner

*Primary Examiner* — Jiping Lu
(74) *Attorney, Agent, or Firm* — The Belles Group, P.C.

(57) ABSTRACT

A system and method for drying cavities loaded with high level waste ("HLW") is devised. The invention utilizes a non-intrusive procedure that is based on monitoring the dew point temperature of a non-reactive gas that is circulated through the cavity. In one aspect, the invention is a system for drying a cavity loaded with HLW comprising: a canister forming the cavity, the cavity having an inlet and an outlet; and a source of non-reactive gas. The system further flows the non-reactive gas from the source of non-reactive gas through the cavity; and repetitively measures the dew point temperature of the non-reactive gas exiting the cavity.

12 Claims, 6 Drawing Sheets

METHOD AND APPARATUS FOR DEHYDRATING HIGH LEVEL WASTE BASED ON DEW POINT TEMPERATURE MEASUREMENTS

CROSS-REFERENCE TO RELATED APPLICATIONS

The present application is a divisional of U.S. patent application Ser. No. 11/145,785, filed on Jun. 6, 2005 now U.S. Pat. No. 7,707,741, the entirety of which is hereby incorporated by reference.

FIELD OF THE INVENTION

The present invention relates generally to the field of storing high level waste ("HLW"), and specifically to the field of drying HLW for storage and/or transportation in the "dry state."

BACKGROUND OF THE INVENTION

The storage, handling, and transfer of HLW, such as spent nuclear fuel, requires special care and procedural safeguards. In the operation of nuclear reactors, hollow zircaloy tubes filled with enriched uranium, known as fuel assemblies, are burned up inside the nuclear reactor core. It is customary to remove these fuel assemblies from the reactor after their energy has been depleted down to a predetermined level. Upon depletion and subsequent removal, this spent nuclear fuel ("SNF") is still highly radioactive and produces considerable heat, requiring that great care be taken in its subsequent packaging, transporting, and storing. Specifically, the SNF emits extremely dangerous neutrons and gamma photons. It is imperative that these neutrons and gamma photons be contained at all times subsequent to removal from the reactor core.

In defueling a nuclear reactor, it is common place to remove the SNF from the reactor and place the SNF under water, in what is generally known as a spent fuel pool or pond store. The pool water facilitates cooling of the SNF and provides adequate radiation shielding. The SNF is stored in the pool for a period long enough to allow the decay of heat and radiation to a sufficiently low level to allow the SNF to be transported with safety. However, because of safety, space, and economic concerns, use of the pool alone is not satisfactory when the SNF needs to be stored for a considerable length of time. Thus, when long-term storage of SNF is required, it is standard practice in the nuclear industry to store the SNF in a dry state subsequent to a brief storage period in the spent fuel pool, i.e., storing the SNF in a dry inert gas atmosphere encased within a structure that provides adequate radiation shielding. One typical structure that is used to store SNF for long periods of time in the dry state is a storage cask.

Storage casks have a cavity suitably sized to receive a canister of SNF and are designed to be large, heavy structures made of steel, lead, concrete and an environmentally suitable hydrogenous material. Typically, storage casks weigh about 150 tons and have a height greater than 15 ft. A common problem associated with storage casks is that they are too heavy to be lifted by most nuclear power plant cranes. Another common problem is that storage casks are generally too large to be placed in spent fuel pools. Thus, in order to store SNF in a storage cask subsequent to being cooled in the pool, the SNF must be removed from the pool, prepared in a staging area, and transported to the storage cask. Adequate radiation shielding is needed throughout all stages of this transfer procedure.

As a result of the SNF's need for removal from the spent fuel pool and additional transportation to a storage cask, an open canister is typically submerged in the spent fuel pool prior to the SNF being removed from the reactor core. The SNF is then placed directly into the open canister while submerged in the water. However, even after sealing, the canister alone does not provide adequate containment of the SNF's radiation. A loaded canister cannot be removed or transported from the spent fuel pool without additional radiation shielding. Thus, apparatus and methods that provide additional radiation shielding during the transport of the SNF have been developed. The additional radiation shielding is typically achieved by positioning the canisters in large cylindrical containers called transfer casks while submerged within the pool. Similar to storage casks, transfer casks have a cavity suitably sized to receive the canister and are designed to shield the environment from the radiation emitted by the SNF within.

In facilities utilizing transfer casks to transport loaded canisters, an empty canister is first placed into the cavity of an open transfer cask. The canister and transfer cask are then submerged in the spent fuel pool. Previously discharged SNF from reactors located in wet storage is moved into the submerged canister (which is within the transfer cask and filled with water). The loaded canister is then fitted with its lid, enclosing the SNF and the water from the pool within the canister. The loaded canister and transfer cask are then removed from the pool by a crane and set down in a staging area to prepare the SNF-loaded canister for storage or transportation in a dry condition. In order for an SNF-loaded canister to be properly prepared for dry storage or transportation, the United States Nuclear Regulatory Commission ("NRC") requires that the SNF and interior of the canister be adequately dried before the canister is sealed and transferred to the storage cask. Specifically, NRC regulations mandate that the vapor pressure ("vP") within the canister be at or below 3 Torr (1 Torr=1 mm Hg) before the canister is backfilled with an inert gas and sealed. Vapor pressure is the pressure of the vapor over a liquid at equilibrium, wherein equilibrium is defined as that condition where an equal number of molecules are transforming from the liquid phase to gas phase as there are molecules transforming from the gas phase to liquid phase. Requiring a low vP of 3 Torr or less assures an adequately dry space in the canister interior suitable for long-term SNF storage or transportation.

Currently, nuclear facilities comply with the NRC's 3 Torr or less vP requirement by performing a vacuum drying process. In performing this process, the bulk water that is within the canister is first drained from the canister. Once the bulk of the liquid water is drained, a vacuum system is coupled to the canister and activated so as to create a sub-atmospheric pressure condition within the canister. The sub-atmospheric condition within the canister facilitates evaporation of the remaining liquid water while the vacuum helps remove the water vapor. The vP within the canister is empirically ascertained through a vacuum-and-hold procedure. If necessary, the vacuum-and-hold procedure is repeated until the pressure rise during a prescribed test duration (30 minutes) is limited to 3 Torr. Once the vacuum drying passes the acceptance test, the canister is backfilled with an inert gas and the canister is sealed. The transfer cask (with the canister therein) is then transported to a position above a storage cask and the SNF-loaded canister is transferred into the storage for long-term storage.

Current methods of satisfying the NRC's 3 Torr or less vP requirement are time consuming, manually intensive and prone to error from line and valve leakages. Any time the canister must be physically approached for vacuum monitoring and dryness testing, there is the risk of exposing the work personnel to high radiation. Moreover, the creation of sub-atmospheric conditions in the canister requires expensive vacuum equipment and can cause complicated equipment problems.

SUMMARY OF THE INVENTION

It is therefore an object of the present invention to provide a method and system for drying a canister loaded with HLW.

Another object of the present invention is to provide a method and system for drying a canister loaded with HLW without physically accessing the contents of the canister to ensure that an acceptable level of dryness has reached within the canister.

Yet another object of the present invention is to provide a method and system for drying a canister loaded with HLW without subjecting the interior of the canister to sub-atmospheric conditions.

Still another object of the present invention is to provide a method and system for drying a canister loaded with HLW without using expensive vacuum equipment.

A further object of the present invention is to provide a method and system for preparing an SNF-loaded canister for dry storage that is easy to implement and/or time efficient.

A yet further object of the present invention is to provide a method and system for preparing a canister loaded with HLW for dry storage in a more cost effective manner.

These objects and other objects are met by the present invention which in one aspect is a method of drying a cavity loaded with "HLW" comprising: a) flowing a non-reactive gas through the cavity; b) repetitively measuring dew point temperature of the nonreactive gas exiting the cavity; and c) upon the dew point temperature of the non-reactive gas exiting the cavity being measured to be at or below a predetermined dew point temperature for a predetermined time, discontinuing the flow of the non-reactive gas and sealing the cavity.

By ensuring that the non-reactive gas coining out of the cavity has a dew point temperature that is at or below the predetermined dew point temperature for the predetermined period of time, it is ensured that the cavity is adequately dry (i.e., that the vP of the non-reactive gas within the cavity is below a desired level without the need to physically measure the vP therein).

In some embodiments, the predetermined dew-point temperature is selected so that a desired vapor pressure is achieved within the cavity, such as 3 Torr or less.

The flow rate of the non-reactive gas through the cavity determines the predetermined time for a specified dryness level (i.e., a predetermined dew point temperature). The predetermined dew point temperature and the predetermined time for any sized cavity volume canister can be determined through experimentation or simulation.

In some embodiments, the inventive method may further comprise the steps of: d) drying the non-reactive gas that exits the cavity after the dew point temperature is measured; and e) re-circulating the dried non-reactive gas through the cavity. The drying step can be performed by contacting the non-reactive gas with a desiccant or by chilling the non-reactive gas.

In some embodiments, the non-reactive gas will be circulated through the cavity at a predetermined flow rate. The predetermined flow rate can be chosen so that the volume of the cavity is turned over 25 to 50 times during the predetermined time.

In some embodiments, the predetermined dew point temperature can be in a range of approximately 20 to 26° F., and the predetermined time is in a range of approximately 25 to 35 minutes. In one embodiment, it is preferred that the predetermined dew point temperature be approximately 22.9° F. and the predetermined time be approximately 30 minutes.

Suitable non-reactive gases include, without limitation, nitrogen, carbon dioxide, light hydrocarbon gases, or a noble gas selected from a group consisting of helium, argon, neon, radon, krypton, and xenon.

In another aspect, the invention can be a system for drying a cavity loaded with HLW comprising a canister forming the cavity, the cavity having an inlet and an outlet; a source of non-reactive gas; means for flowing the non-reactive gas from the source of non-reactive gas through the cavity; and means for repetitively measuring the dew point temperature of the non-reactive gas exiting the cavity. The dew point temperature measuring means can be any type of a direct moisture-sensing device, e.g., a hygrometer, or by other means, e.g., gas chromatography, mass spectroscopy etc.

In some embodiments, the system can further comprise means for drying the nonreactive gas. Suitable drying means include the use of a chiller, freezer, and/or condenser or the use of desiccant. In such an embodiment, the drying means will be located downstream of the dew point temperature measuring means. Embodiments of the system that comprises a drying means can also comprise means for re-circulating the desired non-reactive gas from the drying means back into the non-reactive gas source. This can be accomplished through the use of a recirculation line.

In some embodiments, the system can be automated, and will further include: a controller operably coupled to the dew point temperature measuring means. In such an embodiment, the dew point temperature measuring means is preferably adapted to create signals indicative of the measured dew point temperature of the non-reactive gas and transmit the signals to the controller. The controller is adapted to analyze the signals and upon determining that the signals indicate that the measured dew point temperature is at or below the predetermined dew point temperature for the predetermined time, the controller is further adapted to (1) cease flow of the non-reactive gas through the cavity; and/or (2) activate a means for indicating that the cavity is dry.

In one embodiment, the system will further comprise a spent fuel cask. In such an embodiment, the canister will be positioned and dried within the cask.

Finally, it is preferred that the cavity have a top and a bottom, and that an inlet be located at or near the bottom of the cavity for supplying the non-reactive gas to the cavity and that an outlet for removing the wet non-reactive gas from the cavity be located at or near the top of the cavity.

DETAILED DESCRIPTION OF THE DRAWINGS

Figure 1:
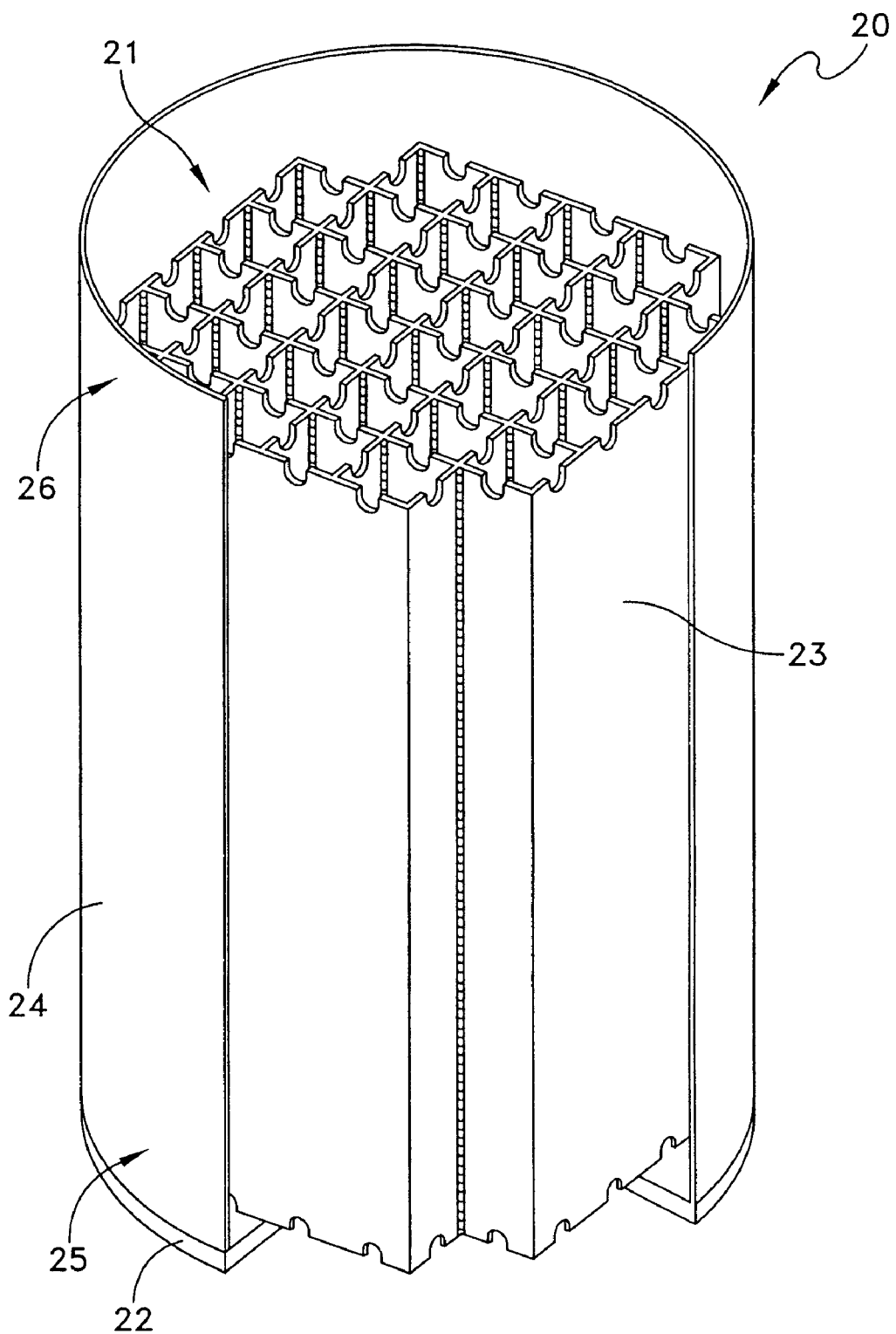
FIG. 1 is a perspective view of an embodiment of an open canister that can be used in conjunction with the present invention shown partially in section and empty.

FIG. 1 illustrates a canister 20 that is suitable for use with the present invention. The present invention is not limited to specific canister geometries, structures, or dimensions and is applicable to any type of enclosure vessel used to transport, store, or hold radioactive elements. While the exemplified embodiment of the invention will be described in terms of its use to dry a canister of spent nuclear fuel ("SNF"), it will be appreciated by those skilled in the art that the systems and methods described herein can be used to dry radioactive waste in other forms and in a variety of different containment structures as desired.

The canister 20 comprises a bottom plate 22 and a cylindrical wall 24 which forms a cavity 21. As used herein, the end 25 of the canister 20 that is closest to the bottom plate 22 will be referred to as the bottom of the canister 20 while the end 26 of the canister 20 that is furthest from the bottom plate 22 will be referred to as the top of the canister 20. The cavity 21 has a honeycomb grid 23 positioned therein. The honeycomb grid 23 comprises a plurality of rectangular boxes adapted to receive spent nuclear fuel ("SNF") rods. The invention is not limited by the presence of the honeycomb grid.

The canister 20 further comprises a drain pipe with an open bottom (not illustrated) located at or near the bottom of the canister 20 that provides a sealable passageway from outside of the canister 20 to the interior of the cavity 21. If desired, the drain opening can be located in the bottom plate 22 or near the bottom of the canister wall. The drain pipe can be opened or hermetically sealed using conventional plugs, drain valves, or welding procedures.

Figure 2:
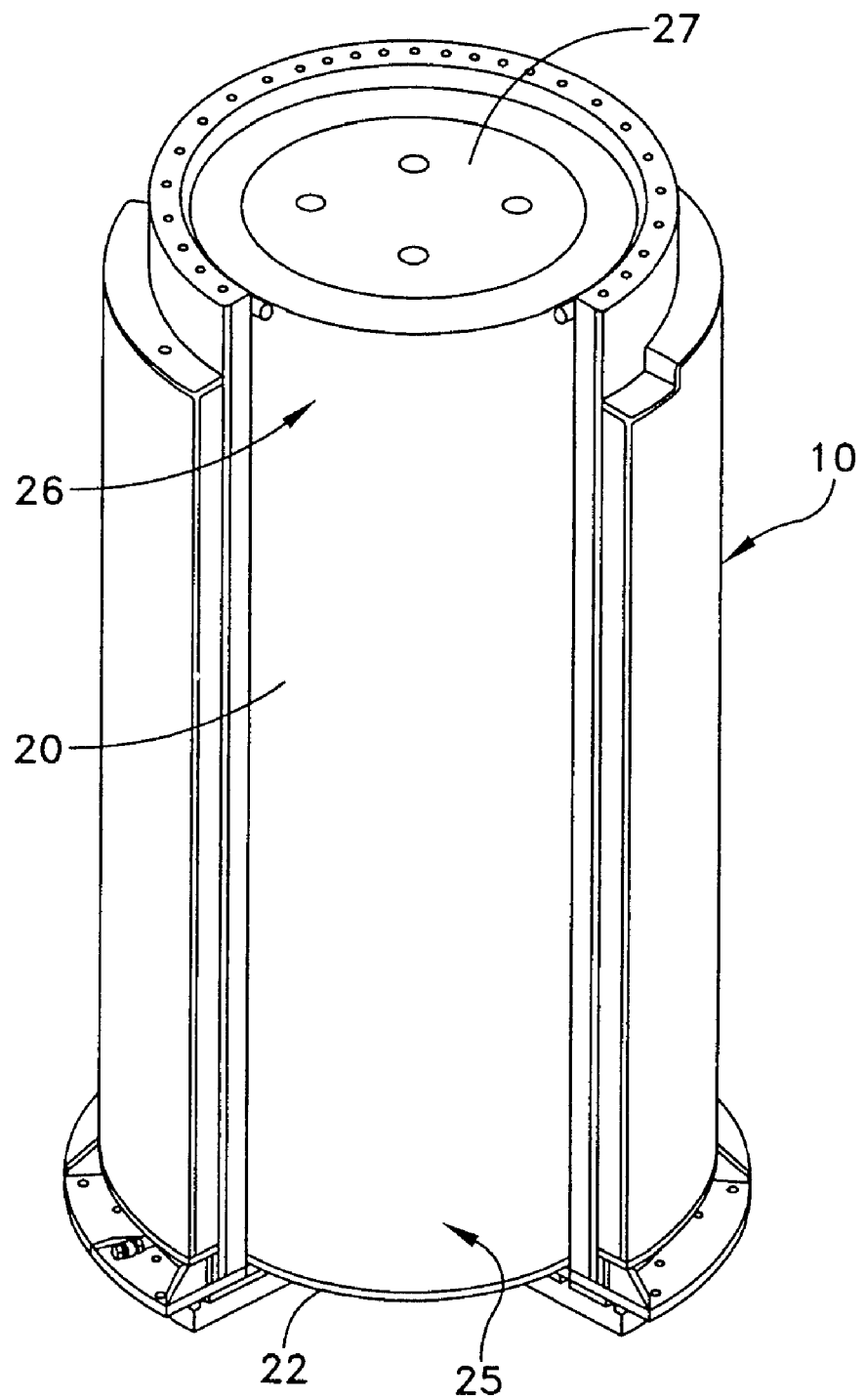
FIG. 2 is a perspective view of a transfer cask partially in section with the canister of FIG. 1 sealed and positioned in the transfer cask.

As illustrated in FIG. 1, the canister 20 is empty (i.e. the cavity 21 does not have SNF rods placed in the honeycomb grid 23) and the top 26 of the canister 20 is open. In utilizing the canister 20 to transport and store SNF rods, the canister 20 is placed inside a transfer cask 10 (FIG. 2) while the canister 20 is open and empty. The open transfer cask 10, which is holding the open canister 20, is then submerged into a spent fuel pool which causes the volume of the cavity 21 to become filled with water. SNF rods that are removed from the nuclear reactor are then moved under water from the spent fuel pool and placed inside the cavity 21 of the canister 20. Preferably, a single bundle of SNF rods is placed in each rectangular box of the honeycomb grid 23. Once the cavity 21 is fully loaded with the SNF rods, the canister lid 27 (FIG. 2) is positioned atop the canister 20. The canister lid 27 has a plurality of sealable lid holes 28 that form a passageway into the cavity 21 from outside of the canister 20 when open. The transfer cask 10 (having the loaded canister 20 therein) is then lifted from the spent fuel pool by a crane and placed uprightly in a staging area (as shown in FIG. 2) so that the canister 20 can be properly prepared for dry-storage. This dry-storage preparation includes drying the interior of the canister 20 and sealing the lid 27 thereto.

Referring now to FIG. 2 exclusively, when in the staging area, the canister 20 (containing the SNF rods and pool water) is within the transfer cask 10. Both the canister 20 and the transfer cask 10 are in an upright position. Once in the staging area, the drain pipe attached to the canister lid 27 (not illustrated) with a bottom opening at or near the bottom 25 of the canister 20 is used to expel the bulk water that is trapped in the cavity 21 of the canister 20 using a blowdown gas (usually helium or nitrogen). Despite draining the bulk water from the cavity 21, residual moisture remains in the cavity 21 and on the SNF rods. However, before the canister 20 can be permanently sealed and transported to a storage cask for long-term dry storage or transportation, it must be assured that that cavity 21 and the SNF rods contained therein are adequately dried. Because a low vapor pressure ("vP") within a container indicates that a low level of moisture is present, the United States Nuclear Regulatory Commission ("NRC") requires compliance to the 3 Torr or less vapor pressure ("vP") specification within the cavity 21 of HLW containing casks.

Figure 3:
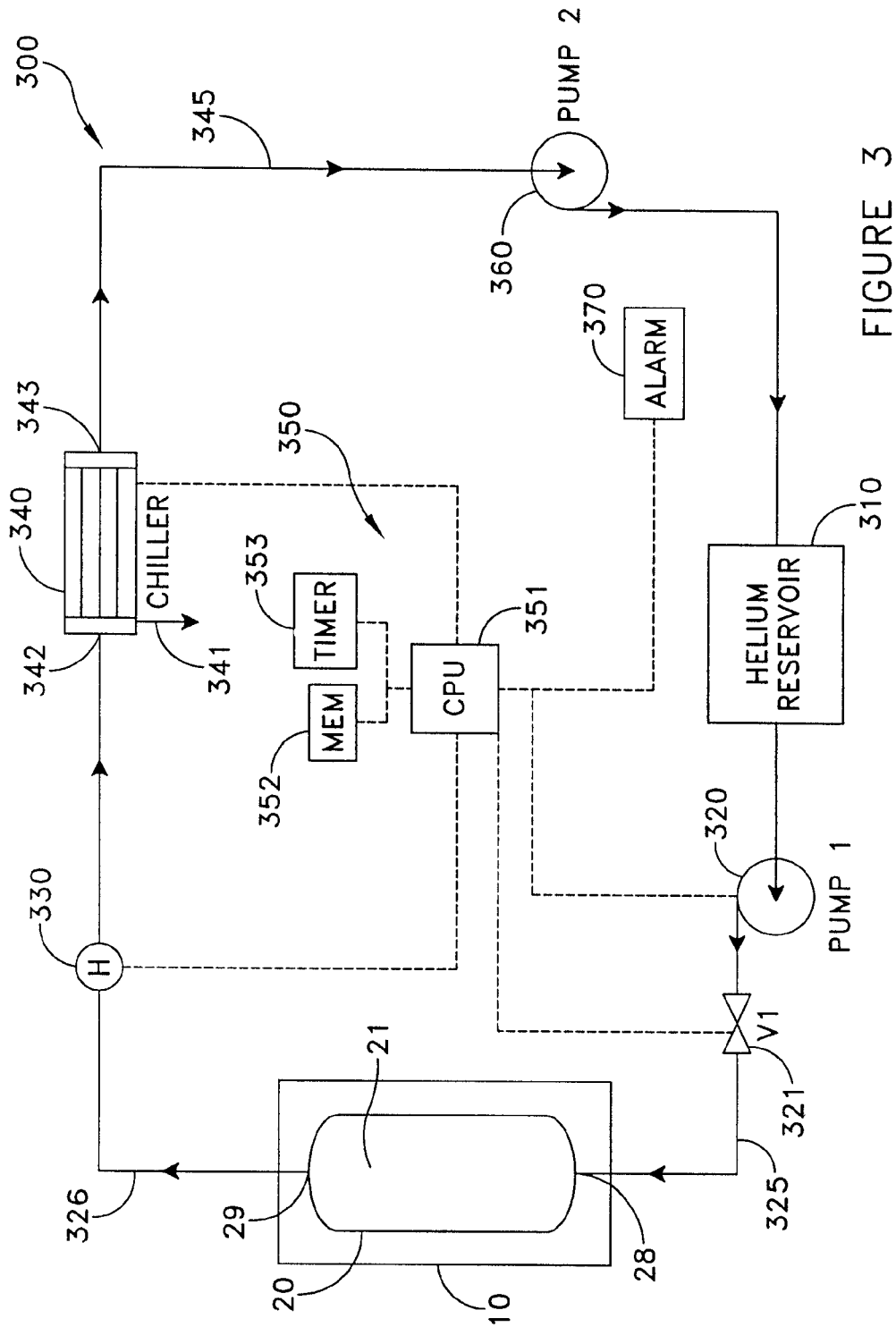
FIG. 3 is a schematic diagram of a closed-loop system according to the present invention.

FIG. 3 is a schematic of an embodiment of a closed-loop drying system 300 capable of drying the cavity 21 to acceptable NRC levels without the need to intrusively measure the resulting vP within the cavity 21. Once the transfer cask 10, which is holding the canister 20, is positioned in the staging area and the bulk water is drained from the cavity 21, the drying system 300 is connected to the inlet 28 and outlet 29 of the canister 20 so as to form a closed-loop system. More specifically, the gas supply line 325 is fluidly connected to the inlet 28 of the canister 20 while the gas exhaust line 326 is fluidly connected to the outlet 29 of the canister 20. The inlet 28 and outlet 29 of the canister are mere holes in the canister 20. If desired, proper port connections, seals, and/or valves can be incorporated into the inlet and outlet 28, 29.

The drying system 300 comprises a non-reactive gas reservoir 310, a supply pump 320, a flow rate valve 321, a dew point temperature hygrometer 330, a chiller 340, a recirculation pump 360, and a control system 350, which includes a suitably programmed microprocessor 351, a computer memory medium 352, a timer 353, and an alarm 370. While the illustrated embodiment of the drying system 300 is automated via the control system 350, neither the method nor system of the present invention is so limited. If desired, the functions carried out by the control system 350 can be carried out manually and/or omitted in some instances.

The helium reservoir 320, the canister 20, and the chiller 340 are fluidly connected so that a non-reactive gas, such as helium, can flow through the closed-loop drying system 300 without escaping into the external environment. More specifically, the gas supply line 325 fluidly connects the helium reservoir 310 to the canister 20, the gas exhaust line 326 fluidly connects the canister 20 to the chiller 340, and the recirculation line 345 fluidly connects the chiller 340 to the helium reservoir 310, thereby forming a closed-loop gas circulation path. All of the gas lines 325, 326, and 345 can be formed of suitable tubing or piping. The piping and tubing can be constructed of flexible or non-flexible conduits. The conduits can be formed of any suitable material, such as metals, alloys, plastics, rubber, etc. All hermetic connections can be formed through the use of threaded connections, seals, ring clamps, and/or gaskets.

The helium gas reservoir 310 is used to store helium gas. While helium gas is the preferred non-reactive gas for use in the present invention, any non-reactive gas can be used in conjunction with the system 300 and the operation thereof. For example, other suitable non-reactive gases include, without limitation, nitrogen, carbon-dioxide, light hydrocarbon gases such as methane, or any inert gas, including but not limited to noble gases (helium, argon, neon, radon, krypton and xenon).

The supply pump 320 is operably coupled to the gas supply line 325. When activated, the supply pump 320 draws helium gas from the helium reservoir 310 and forces the helium gas into the cavity 21 of the canister 20 via the gas supply line 325. The helium gas continues to flow through the canister 20 and into the chiller 340 via the gas exhaust line 326. The recirculation pump 360 is operably coupled to the recirculation line 345. When activated, the recirculation pump 360 draws the helium gas that has been de-moisturized from the chiller 340 and forces the dry helium gas back into the helium reservoir 310 for further recirculation through the canister 20. While two pumps 320, 360 are illustrated as being incorporated into the drying system 300, the invention is not so limited and any number of pumps can be used. The exact number of pumps will be dictated on a case-by case design basis, considering such factors as flow rate requirements, pressure drops in the system, size of the system, and/or number of components in the system. The direction of the helium gas flow through system 300 is indicated by the arrows on the fluid lines.

A flow rate valve 321 is operably coupled to the gas supply line downstream of the supply pump 320. The valve 321 is used to control the flow rate of the helium gas into and through the cavity 21 of the canister 20 and throughout the drying system 300. The valve 321 can be an adjustable flow rate valve. In other embodiments of the invention, the flow rate of the helium gas through the drying system 300 can be alternatively controlled by incorporating a mass flow rate controller. As with the pumps, any number of valves can be incorporated throughout the system 300 as desired. Moreover, the invention is not limited by any specific placement of the valve(s) or pump(s) along the closed-loop flow circuit.

The dew-point temperature hygrometer 330 is operably coupled to the gas exhaust line 326 so that the dew-point temperature of the helium gas exiting the cavity of the canister 20 can be measured. Suitable means for dew point temperature measurement include direct moisture sensing devices, such as hygrometers, and other means, such as gas chromatography or mass spectroscopy. The hygrometer 330 preferably includes a digital signal in some embodiments. The dew point temperature hygrometer 330 repetitively measures the dew point temperature of the helium gas exiting the cavity 21. There is no requirement as to the sampling rate for repetitive measurements. For example, the dew point temperature hygrometer 330 can measure the dew point temperature of the helium gas multiple times per second or only once every few minutes. In some embodiments, the time intervals between repetitive measurements will be so small that the measurements will appear to be essentially continuous in nature. The time intervals will be determined on case-by case design basis, considering such factors as functionality requirements of the system and the flow rate of the helium gas.

The inlet 342 of the chiller 340 is coupled to the gas exhaust line 326 while the outlet 343 is fluidly coupled to the recirculation line 345. The chiller 340 is provided to adequately de-moisturize the wet helium gas that exits the cavity 21 of the canister 20 so that the helium gas can be re-circulated back into the helium gas reservoir 320 for further use in the drying of the cavity 21. By sufficiently chilling the wetted helium gas that exits the cavity 21 of the canister 20, the water vapor in the helium gas will condense out of the helium gas in the chiller 340 and be removed via the drain 341 in liquid form. The exact temperature to which the wetted helium gas will be chilled will depend on the desired level of dryness. The greater the level of dryness desired, the lower the temperature. In one embodiment of the invention, it may be desirable to chill the wetted helium gas to a temperature of 25° F. or less. Once de-moisturized in the chiller 340, the dry helium gas will be re-circulated back into the reservoir 310 for further use.

While the wetted helium gas is de-moisturized in the illustrated embodiment of the drying system 300 using a chiller 340, other de-moisturizing apparatus and methods can be used instead of or in addition to the chiller 340 if desired. For example, a condenser or freezer may be used. In another embodiment, the wetted helium as may be exposed to a suitable desiccant, such as silica gel, that will absorb the water vapor from the wetted helium gas stream. The desiccant can be dried as necessary through heating, UV exposure, or other conventional drying process and subsequently reused.

In embodiments of the present invention that do not recirculate the helium gas, de-moisturizing the wetted helium gas will not be necessary. As such, the chiller 340 or other drying module will be omitted.

The drying system 300 further comprises an automation system 350. The automation system 350 comprises a CPU 351, a computer memory medium 352, a timer 353, and an alarm 370. The CPU 351 is a suitable, microprocessor based programmable logic controller, personal computer, or the like. The computer memory medium 352 can be a hard drive that comprises sufficient memory to store all of the necessary computer code, algorithms, and data necessary for the operation and functioning of the drying system 300, such as predetermined time, predetermined dew-pint temperature, desired chilling temperatures, flow rates, and the like. The timer 353 is a standard digitalized or internal computer timing mechanism. The alarm 370 can be a siren, a light, an LED, a display module, a speaker, or other device capable of generating audio and/or visual stimulus. While an alarm 370 is illustrated and described, any instrumentation, device, or apparatus that inform an operator that the drying system 300 has completed a drying process can be used. For example, a computer screen can simply indicate that the canister is dry via text or visuals.

The CPU 351 includes various input/output ports used to provide connections to the various components 320, 321, 330, 340, 360, 370, 352, 353 of the drying system 300 that need to be controlled and/or communicated with. The CPU 351 is operably coupled to these components via electrical wires, fiber-optic lines, co-axial cables, or other data transmission lines. These connections are indicated by the dotted lines in FIG. 3. The CPU 351 can communicate with any and all of the various components of the drying system 300 to which it is operably connected in order to control the drying system 300, such as: (1) activating or deactivating the pumps 320, 360; (2) opening, closing, and/or adjusting the flow rate valve 321; (3) activating or deactivating the chiller 340; and (3) activating or deactivating the alarm 370.

The CPU 351 (and/or the memory 352) is also programmed with the proper algorithms to receive data signals from the dew-point hygrometer 330, analyze the incoming data signals, compare the values represented by the incoming data signals to stored values and ranges, and track the time at which the values represented by the incoming data signals are at or below the stored values. The type of CPU used depends on the exact needs of the system in which it is incorporated.

Figure 4:
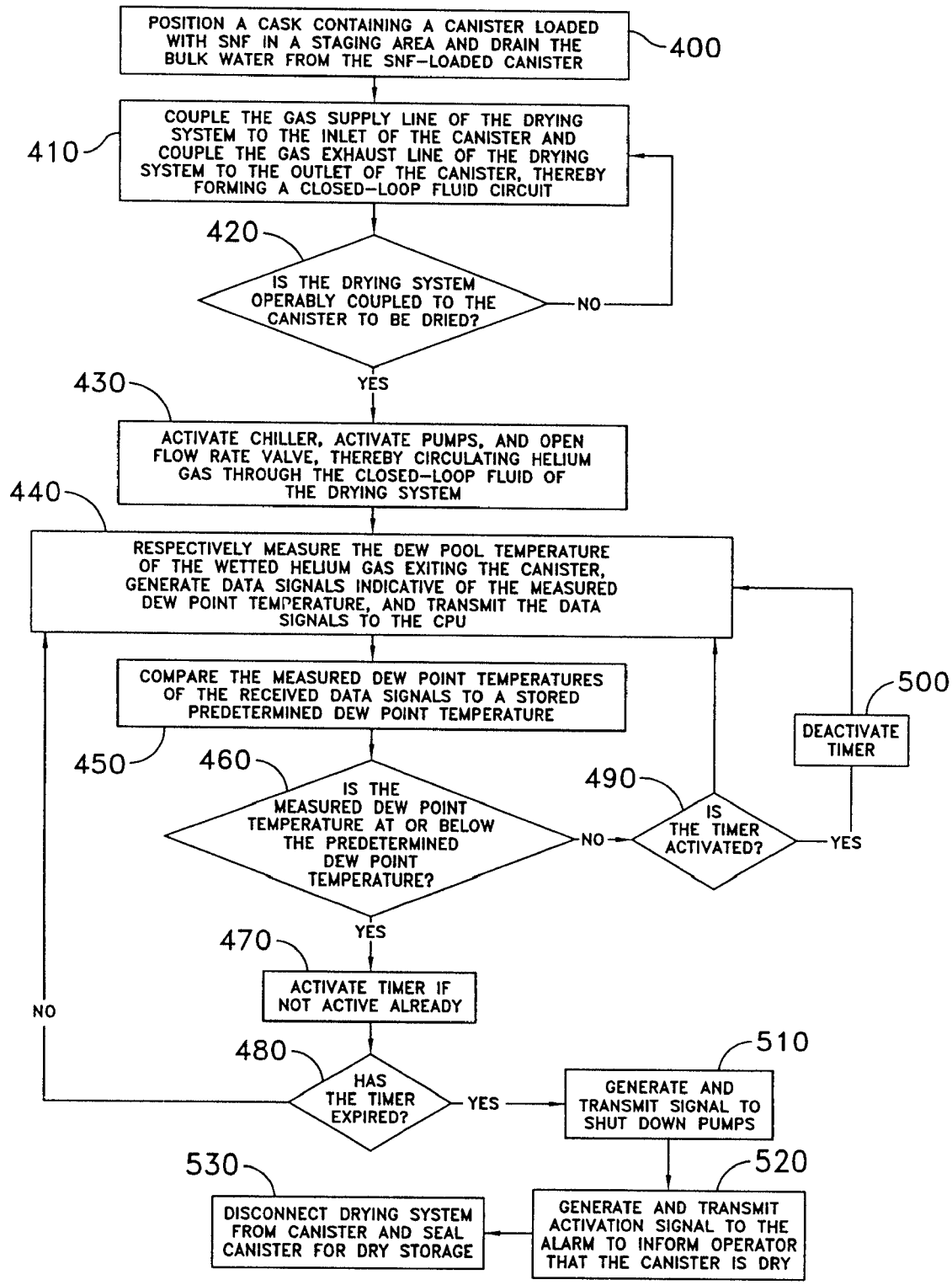
FIG. 4 is a flowchart of a first embodiment of a method of drying a canister loaded with SNF according to the present invention and using the system of FIG. 3.

Referring to FIG. 4, a flowchart of an embodiment of a method of drying a cavity loaded with SNF according to an embodiment of the present invention is illustrated. The method will be described in relation to the drying system 300 of FIG. 3 for ease of description and understanding. However, the method is not limited to any specific structure or system, and can be carried out by other systems and/or apparatuses.

At step 400, the cask 10 containing the SNF loaded canister 20 is positioned in a staging area after being removed from the cooling pool/pond. As discussed above, the cavity 21 of the canister 20 is filled with water from the pool at this time. The bulk water is drained from the cavity 21 of the canister 20 via a properly positioned drain, thereby completing step 400.

Despite the bulk water being drained from the cavity 21 of the canister 20, the interior of the cavity 21 and the SNF are still moisture bearing and need further de-moisturization for long-term storage. In order to further dry the cavity 21 and the SNF, the drying system 300 is utilized. The canister 20 remains in the cask 10 during the drying operation. At step 410, the gas supply line 325 is fluidly coupled to the inlet 28 of the canister 20 while the gas exhaust line 326 is fluidly coupled to the outlet 29 of the canister 20. As a result, a closed-loop fluid circuit is formed in which the cavity 21 of the canister 20 forms a portion of the fluid circuit.

Once the drying system 300 is properly hooked up to the canister 20, the answer to decision block 420 is YES and the operator activates the drying system 300. The drying system 300 can be activated manually by switching on the equipment or in an automated fashion by the CPU 351. When activated in an automated fashion, an operator will activate the drying system 300 by entering a system activation command into a user input device (not illustrated), such as a keyboard, computer, switch, button, or the like, which is operably coupled to the CPU 351. Upon receiving the associated system activation signal from the user input device, the CPU 351 sends the appropriate activation signals to the pumps 320, 360, the chiller 340, the hygrometer 330, and the flow rate valve 321.

Activating the supply pump 320 and the recirculation pump 360 results in the helium gas being drawn from the helium reservoir 310 and flowed through the closed-loop fluid circuit (which includes the gas supply line 325, the canister 20, the gas exhaust line 326, the chiller 340, and the recirculation line 345). The flow rate of the helium gas through the drying system 300 is controlled by the flow rate valve 321, which is preferably an adjustable valve. In one embodiment to the present invention, the CPU 351 opens the flow rate valve so that the helium gas flows through the canister 20 at a flow rate of approximately 400 lb/hr. However, the invention is not so limited and other flow rates can be used. The exact flow rate to be used in any particular drying operation will be determined on a case-by-case design basis, considering such factors as the open volume of the canister's cavity, the target dryness level within the canister's cavity, the initial moisture content within the canister's cavity, the moisture content of the helium gas maintained within the reservoir, desired number of hourly volume turnovers for the canister etc.

The chiller 340 is also activated by the CPU 351 so that the wetted helium gas exiting the canister 20 can be de-moisturized prior to being re-circulated back into the helium reservoir 310. In one embodiment, the CPU 351 activates the chiller 340 so that the helium gas is chilled to a temperature of 25° F. or less. However, the chiller 340 can be used to cool the helium gas to any desired temperature that suitably de-moisturizes the helium gas. As discussed above, in some embodiments of the invention, other de-moisturizing apparatus, such as those that utilize a desiccant, can be used to dry the wetted helium gas instead of the chiller 340.

Upon being activated, the supply pump 320 draws dry helium gas from the helium reservoir 310 and flows the dry helium gas into the wet cavity 21 of the canister 20 via the inlet 28. Upon entering the cavity 21, the dry helium gas absorbs water from the SNF and internal surfaces of the cavity 21 in the form of water vapor. The moisture laden helium gas then exits the cavity 21 via the outlet 29. As the wet helium gas exits the cavity 21, the hygrometer 330 repetitively measures its dew point temperature. As the hygrometer 330 measures the dew point temperature of the wetted helium gas, it generates data signals indicative of the measured dew point temperature values and transmits these data signals to the CPU 351 via the electrical connection, thereby completing step 440.

Upon receiving the data signals indicative of the measured dew point temperature values, the CPU 351 compares the measured values to a predetermined dew point temperature value that is stored in the memory medium 352. Thus, step 450 is completed. The predetermined dew point temperature is selected so as to be indicative that the inside of the cavity 21 and the SNF is sufficiently dry for long term storage. In one embodiment, the predetermined dew point temperature is selected so as to correspond to a vapor pressure in the cavity 21 that is indicative of an acceptable level of dryness, such as for example 3 Torr or less. In such embodiments, the predetermined dew point temperature can be selected using either experimental or simulated correlations.

Figure 5:
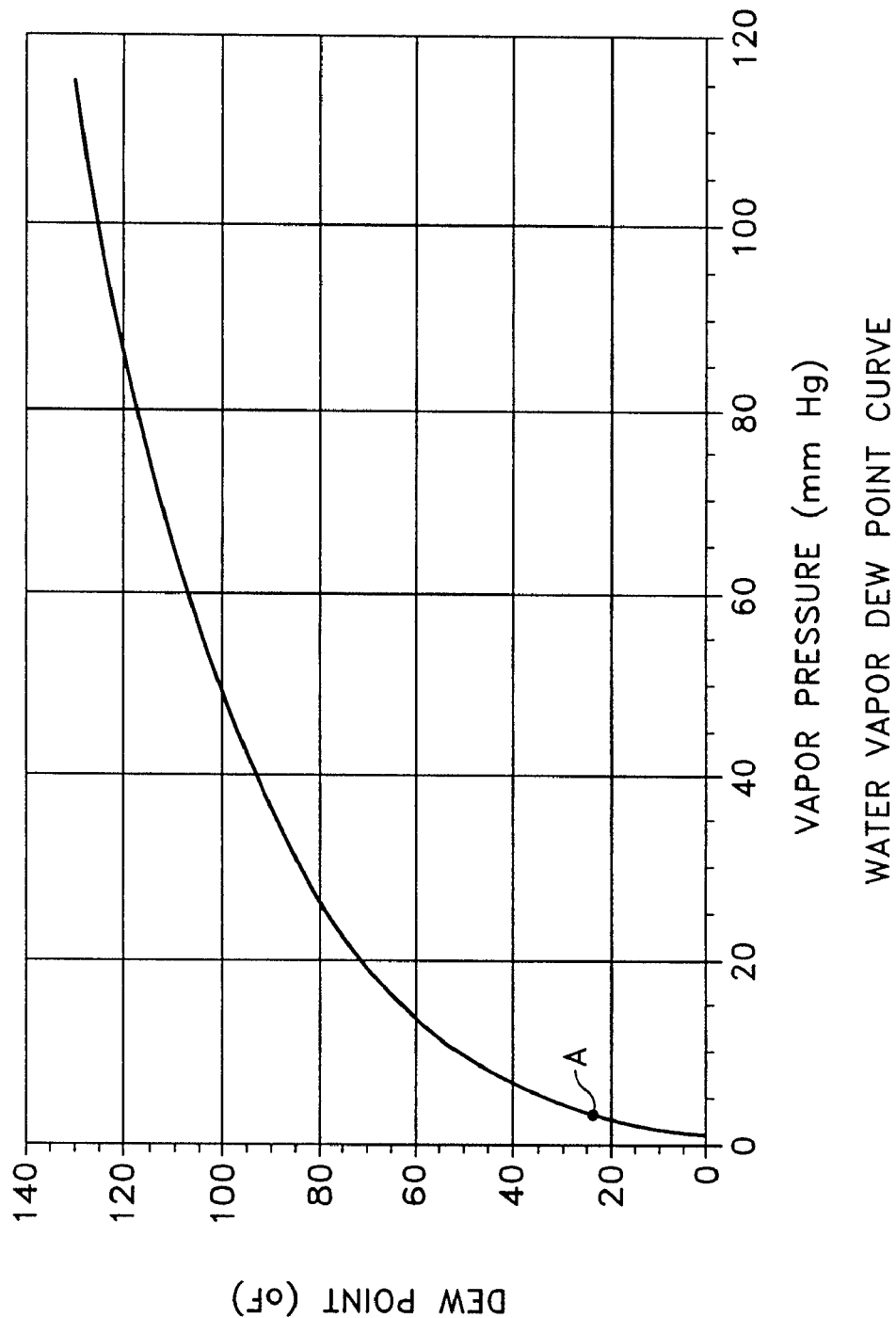
FIG. 5 is a chart plotting the relationship between dew point temperature and vapor pressure for helium gas that can be used to determine a target dew point temperature according to one embodiment of the present invention.

Referring now to FIG. 5, an exemplary embodiment of how one selects the predetermined dew point temperature will be described. As can be seen from the curve delineated in FIG. 5, the water vapor pressure of gases, such as helium, correlates to a dew point temperature. Thus, using this curve, the predetermined dew point temperature can be determined once the target vapor pressure is known. For example, if the target vapor pressure is 3 Torr, this corresponds to a dew point temperature of approximately 22.9° F. This position is indicated by point A on the curve. The target vapor pressure can be mandated by a government or other regulatory organization and can vary greatly. In some embodiments, it is preferable that the predetermined dew point temperature be in the range of approximately 20-26° F., and most preferably about 22.9° F. The invention, however, is not limited to any specific dew point value. The exact dew point temperature of the wetted helium gas that will correspond to an adequately dry state within the cavity 21 will be determined on a case-by-case basis, considering such factors as government regulations, mandated safety factors, the type of HIM being stored, the storage period, etc.

Referring back to FIG. 4, after the CPC 351 compares the measured dew point temperature to the predetermined dew point temperature, the CPU 351 then determines whether the measured dew point temperature is less than or equal to the predetermined dew point temperature, thus performing decision block 460. This comparison is performed for each signal received by the CPU 351.

If the measured dew point temperature of the wetted helium gas exiting the canister is determined to be above the predetermined dew point temperature, the answer at decision block 460 is NO and the CPU 351 will continue to decision block 490. At decision block 490, the CPU 351 determines whether the timer 353 has been activated (which is done at step 470). If the timer 353 is activated, the answer at decision block 490 is YES and the CPU 351 deactivates the timer 353 and returns to step 440. If the timer 353 is not activated, the answer at decision block 490 is NO and the CPU 351 returns directly to step 440. Either way, if the measured dew point temperature of the wetted helium gas exiting the canister is determined to be above the predetermined dew point temperature, the drying system 300 continues to circulate the thy helium gas into and through the cavity 21 of the canister 20.

However, if the measured dew point temperature of the wetted helium gas exiting the canister is determined to be at or below the predetermined dew point temperature, the answer at decision block 460 is YES and the CPU 351 will continue to step 470. At step 470 the CPU 351 activates/starts the timer 353. The timer 470 is programmed to run for a predetermined time. The selection and purpose of the predetermined time will be discussed in greater detail below.

Once the timer is activated at step 470, the CPU 351 proceeds to decision block 480 to determine whether the timer 353 has expired (i.e., whether the predetermined time has passed). If the answer at decision block 480 is NO, the CPU 351 returns to step 440 and the drying system 300 continues to circulate helium gas through the cavity 21 of the canister 20 and repeat the operations of steps 440-470 until the predetermined time expires. In other words, the drying process continues until the measured dew point temperature of the wetted helium gas exiting the canister falls below (or equal to) the predetermined dew point temperature, and remains so for the predetermined time (without subsequently rising above the predetermined dew point temperature).

By requiring that the measured dew point temperature of the wetted helium gas exiting the canister not only reach, but remain at or below the predetermined dew point temperature for the predetermined time, it is ensured that the cavity 21 and the SNF therein are sufficiently dried within an acceptable safety factor. This, alone with the means for selecting the predetermined time, will now be described with respect to FIG. 6.

Figure 6:
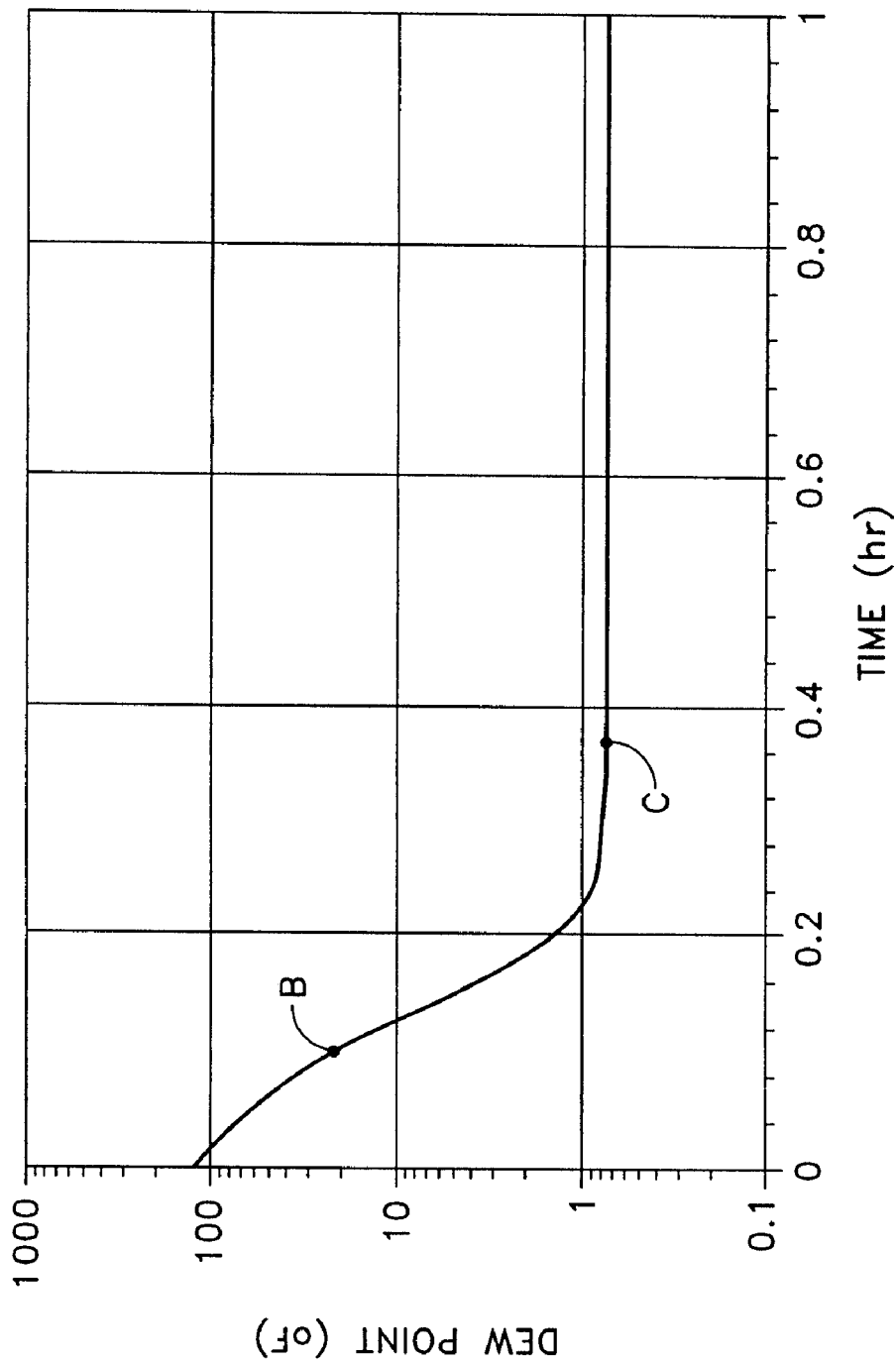
FIG. 6 is a chart plotting the relationship between dew point temperature within a canister and time when subjected to a flow of helium gas according to one embodiment of the present invention.

Referring to FIG. 6, the affect on the dew point temperature that continuing the helium gas flow through the canister 20 over time is exemplified. The data in the graph was simulated assuming a dry helium flow rate of 400 lb/hr, a pressure of 50 psi, a moisture level of 1 mm Hg within the dry helium gas, a canister volume capacity of helium holdup of 10 lb, and an initial canister moisture level of 100 mm Hg. As can be seen from the graph, at time ("t")=0.1 hours (i.e., 6 minutes), it can be estimated that the dew point temperature within the cavity 21 is at about 22.9° F. (which from FIG. 5 corresponds to a vapor pressure of about 3 Torr), indicated on the graph as point B. As the flow of helium gas through the cavity 21 is continued over time, the dew point temperature will continue to decrease until an equilibrium vapor pressure is reached, which in the graphed example is at about t=0.36 hours (i.e., about 22 min), indicated on the graph as point C. If desired, the flow of helium gas through the cavity can be further continued, but it will not result in any further significant decrease of the dew point temperature within the cavity 21.

Taking points B and C as the points of reference, the predetermined time for this example is about 16 minutes (i.e., from 6 minutes to 22 minutes). However, if desired, the predetermined time can be less than or greater than 16 minutes for the example. The exact predetermined time for any situation will be determined on case-by-case design basis, considering such factors as open canister volume, flow rate, desired dryness within the cavity, desired or mandated safety factors, etc. In some embodiments of the invention, the predetermined time will preferably be in the range of 20 to 40 minutes, more preferably in the range of 25 to 35 minutes, and most preferably approximately 30 minutes.

Referring back to FIG. 4, once the predetermined time expires, and the measured dew point temperature remains at or below the predetermined dew point temperature for the entire predetermined time, the CPU 351 arrives at decision block 480 again. However, the answer is now YES and the CPU 351 continues to step 510. At step 510, the CPU 351 generates shut down signals that are transmitted to the pumps 320, 360. Upon receiving the shutdown signals, the pumps 320, 360 are deactivated and the flow of helium gas through the drying system is ceased. Alternatively, the CPU 351 can cease the helium flow by closing the valve 321.

Once the pumps 320, 360 are deactivated, the CPU 351 generates and transmits an activation signal to the alarm 370, thereby completing step 520. Upon receiving the activation signal, the alarm 370 is activated. Depending on the type of device that is used as the alarm 370, the response of the alarm 370 to the activation signal can vary greatly. However, it is preferred that the alarm's 370 response be some type of audio and/or visual stimuli that will inform the operator that the canister 20 is dry. For example, activation of the alarm 370 can generate a sound, display a visual representation on a computer screen, illuminate an LED or other light source, etc.

Upon being informed by the alarm 370 that the cavity 21 of the canister 20 and the SNF is sufficiently dried, the operator disconnects the drying system from the canister 20 and seals the canister 20 for storage, thereby completing step 530.

The foregoing discussion discloses and describes merely exemplary embodiments of the present invention. As will be understood by those skilled in this art, the invention may be embodied in other specific forms without departing from the spirit or essential characteristics thereof.

Specifically, in some embodiments, the drying method of the invention can be carried out manually. In such an embodiment, the pumps and all other equipment will be activated/controlled manually. The readings by the hygrometer can be visually observed by the operator and the timing sequence operations can be performed manually.

What is claimed is:

1. A system for drying a cavity loaded with high level waste ("HLW") comprising:
   a canister forming the cavity, the cavity having an inlet and an outlet;
   a source of non-reactive gas;
   a timer set for a predetermined period of time;
   means for flowing the non-reactive gas from the source of non-reactive gas through the cavity;
   means for repetitively measuring the dew point temperature of the non-reactive gas exiting the cavity; and
   a controller operably coupled to the dew point temperature measuring means and the timer, the controller adapted so that upon determining that the measured dew point temperature is at or below a predetermined dew point temperature, activating the timer and continuing to flow the non-reactive gas through the cavity until expiration of the predetermined period of time.

2. The system of claim 1 further comprising means for drying the non-reactive gas, the drying means located downstream of the dew point temperature measuring means.

3. The system of claim 2 wherein the drying means comprises a chiller.

4. The system of claim 2 wherein the drying means comprises a desiccant.

5. The system of claim 2 further comprising means for re-circulating the non-reactive gas from the drying means back into the non-reactive gas source.

6. The system of claim 1 wherein the controller is further adapted so that upon determining that the measured dew point temperature remained below the predetermined dew point temperature during the entirety of the predetermined period of time, the controller (1) ceases flow of the non-reactive gas through the cavity; and/or (2) activates a means for indicating that the cavity is dry.

7. The system of claim 6 wherein the predetermined dew point temperature is in a range of approximately 20 to 26° F., the predetermined period of time is in a range of approximately 25 to 35 minutes, and the flowing means circulates the non-reactive gas through the cavity at a predetermined flow rate that results in a volume of the cavity being turned over 25 to 50 times during the predetermined period of time.

8. The system of claim 1 wherein the dew point temperature measuring means comprises a hygrometer.

9. The system of claim 1 further comprising a cask, the canister positioned within the cask.

10. The system of claim 1 further comprising:
  a cask, the canister positioned within the cask;
  means for drying the non-reactive gas, the drying means located downstream of the dew point temperature measuring means;
  means for re-circulating the non-reactive gas from the drying means back into the non-reactive gas source, thereby forming a closed-loop system;
  wherein the controller is further adapted so that upon determining that the measured dew point temperature remained at or below the predetermined dew point temperature during the entirety of the predetermined period of time, the controller (1) ceases flow of the non-reactive gas through the cavity; and/or (2) activates a means for indicating that the cavity is dry;
  wherein the predetermined dew point temperature is in a range of approximately 20 to 26° F., the predetermined period of time is in a range of approximately 25 to 35 minutes, and the flowing means circulates the non-reactive gas through the cavity at a predetermined flow rate that results in a volume of the cavity being turned over 25 to 50 times per; and
  wherein the dew point temperature measuring means comprises a hygrometer.

11. The system of claim 1 wherein the controller is further adapted so that if after the tinier is activated the measured dew point temperature is determined to rise above the predetermined dew point temperature before expiration of the predetermined period of time, the controller deactivates the timer and continues to flow the non-reactive gas through the cavity.

12. A system for drying a cavity loaded with radioactive materials comprising:
  a source of non-reactive gas;
  a timer set for a predetermined period of time;
  means for flowing the non-reactive gas from the source of non-reactive gas through the cavity;
  means for repetitively measuring the dew point temperature of the non-reactive gas exiting the cavity; and
  a controller operably coupled to the dew point temperature measuring means and the timer, the controller adapted so that upon determining that the measured dew point temperature is at or below a predetermined dew point temperature, activating the timer and continuing to flow the non-reactive gas through the cavity until expiration of the predetermined period of time.

* * * * *